US011367249B2

(12) United States Patent
Nayak et al.

(10) Patent No.: US 11,367,249 B2
(45) Date of Patent: Jun. 21, 2022

(54) TOOL FOR VIEWING 3D OBJECTS IN 3D MODELS

(71) Applicant: SAP SE, Walldorf (DE)

(72) Inventors: Jitesh Nayak, Rajnanadgaon (IN); Patrick Ashby, Auckland (NZ); Suvodeep Das, Kolkata (IN); David John Valentine, Westmere (NZ); Alexandr Gavrilov, Auckland (NZ)

(73) Assignee: SAP SE, Walldorf (DE)

( * ) Notice: Subject to any disclaimer, the term of this patent is extended or adjusted under 35 U.S.C. 154(b) by 61 days.

(21) Appl. No.: 16/597,010

(22) Filed: Oct. 9, 2019

(65) Prior Publication Data

US 2021/0110595 A1  Apr. 15, 2021

(51) Int. Cl.
*G06T 15/20* (2011.01)
*G06F 3/04815* (2022.01)

(52) U.S. Cl.
CPC .......... *G06T 15/20* (2013.01); *G06F 3/04815* (2013.01); *G06T 2200/24* (2013.01)

(58) Field of Classification Search
None
See application file for complete search history.

(56) References Cited

U.S. PATENT DOCUMENTS

| 6,606,105 | B1 * | 8/2003 | Quartetti | G06F 3/0481 |
| | | | | 715/203 |
| 8,314,790 | B1 * | 11/2012 | Zeiger | G06T 17/00 |
| | | | | 345/419 |
| 2004/0075697 | A1 * | 4/2004 | Maudlin | G06F 16/29 |
| | | | | 715/848 |
| 2005/0210444 | A1 * | 9/2005 | Gibson | G06T 19/00 |
| | | | | 717/108 |
| 2008/0184111 | A1 * | 7/2008 | Mason | G06F 30/00 |
| | | | | 715/275 |
| 2008/0184139 | A1 * | 7/2008 | Stewart | G06F 9/451 |
| | | | | 715/762 |
| 2012/0182291 | A1 * | 7/2012 | Rawat | G06T 19/20 |
| | | | | 345/419 |
| 2013/0241929 | A1 * | 9/2013 | Massarwa | A61B 5/7435 |
| | | | | 345/421 |
| 2014/0129935 | A1 * | 5/2014 | Ovadia Nahon | G06F 3/01 |
| | | | | 715/716 |
| 2014/0281875 | A1 * | 9/2014 | Branton | G06F 40/169 |
| | | | | 715/230 |

(Continued)

OTHER PUBLICATIONS

VRST'13: Proceedings of the 19th ACM Symposium on Virtual Reality Software and Technology Oct. 2013 pp. 223-230 https://doi.org/10.1145/2503713.2503714.*

*Primary Examiner* — Jason A Pringle-Parker
(74) *Attorney, Agent, or Firm* — Fountainhead Law Group P.C.

(57) ABSTRACT

Some embodiments provide a non-transitory machine-readable medium that stores a program executable by at least one processing unit of a device. The program provides a display area for viewing a 3D model that includes a plurality of three-dimensional (3D) objects. The program further provides a tool for viewing 3D objects in the 3D model. The program also determines a 3D object in the plurality of 3D objects in the 3D model to hide. The program further hides the determined 3D object in the 3D model.

19 Claims, 11 Drawing Sheets

(56) References Cited

U.S. PATENT DOCUMENTS

| | | | |
|---|---|---|---|
| 2014/0310641 A1* | 10/2014 | Kornmann | G06F 16/444 715/781 |
| 2016/0378099 A1* | 12/2016 | Senesac | G06F 3/0481 700/83 |
| 2017/0131866 A1* | 5/2017 | Arques | G06F 3/04815 |

* cited by examiner

TOOL FOR VIEWING 3D OBJECTS IN 3D MODELS

BACKGROUND

In three-dimensional (3D) computer graphics, a 3D model is a collection of objects that are each represented mathematically in a 3D space (e.g., points, lines, triangles, surfaces, etc.). 3D software applications can provide a number of different tools for creating 3D models, editing 3D models, viewing 3D models, rendering images of 3D models, etc. When viewing 3D models that have objects that are partially or fully enclosed within one another, it is difficult to know which objects have other objects inside or behind them. One way to determine whether an object has another object inside or behind it is to hide the object from view. Once hidden, objects that are inside or behind the hidden object are now shown. For 3D models with a large number of objects and/or a large number of objects nested inside other objects, it can be cumbersome to iterate through the various different objects to see whether they have objects inside or behind them.

SUMMARY

In some embodiments, a non-transitory machine-readable medium stores a program executable by at least one processing unit of a device. The program provides a display area for viewing a 3D model that includes a plurality of three-dimensional (3D) objects. The program further provides a tool for viewing 3D objects in the 3D model. The program also determines a 3D object in the plurality of 3D objects in the 3D model to hide. The program further hides the determined 3D object in the 3D model.

In some embodiments, the 3D object may be a first 3D object. The program may further receive input requesting to view a 3D object in the 3D model that is behind a 3D object displayed in the display area of the tool, where the determined 3D object in the 3D model is hidden in response to receiving the input, and determine a second 3D object in the plurality of 3D objects in the 3D model to hide. In some embodiments, the program may further receive input requesting to view a 3D object behind a 3D object displayed in the display area of the tool and, in response to the request, hide the determined second 3D object in the 3D model. The input may be a first input. The program may further receive a second input requesting to view a 3D object in the 3D model that is in front of a 3D object displayed in the display area of the tool and, in response to receiving the second input, unhide the determined 3D object.

In some embodiments, the display area may be a first display area. The tool may include a second display area for focusing on 3D objects in the 3D model. Determining the 3D object in the plurality of 3D objects in the 3D model to hide may include determining a subset of the 3D objects in the 3D model that are visible within the second display area of the tool and determining a closest 3D object in the subset of the 3D objects in the 3D model as the determined 3D object in the plurality of 3D objects in the 3D model to hide.

In some embodiments, the 3D object may be a first 3D object. The program may further receive input that moves the tool from a first position in the display area to a second position in the display area and, in response to moving the tool from the first position to the second position, determine a second 3D object in the plurality of 3D objects in the 3D model to hide. The input may be a first input. The program may further receive a second input requesting to view a 3D object behind a 3D object displayed in the display area of the tool and, in response to the second input, hide the determined second 3D object in the 3D model.

In some embodiments, a method provides a display area for viewing a 3D model that includes a plurality of three-dimensional (3D) objects. The method further provides a tool for viewing 3D objects in the 3D model. The method also determines a 3D object in the plurality of 3D objects in the 3D model to hide. The method further hides the determined 3D object in the 3D model.

In some embodiments, the 3D object may be a first 3D object. The method may further receive input requesting to view a 3D object in the 3D model that is behind a 3D object displayed in the display area of the tool, where the determined 3D object in the 3D model is hidden in response to receiving the input and determine a second 3D object in the plurality of 3D objects in the 3D model to hide. The method may further receive input requesting to view a 3D object behind a 3D object displayed in the display area of the tool and, in response to the request, hide the determined second 3D object in the 3D model. The input may be a first input. The method may further receive a second input requesting to view a 3D object in the 3D model that is in front of a 3D object displayed in the display area of the tool and, in response to receiving the second input, unhide the determined 3D object.

In some embodiments, the display area may be a first display area. The tool may include a second display area for focusing on 3D objects in the 3D model. Determining the 3D object in the plurality of 3D objects in the 3D model to hide may include determining a subset of the 3D objects in the 3D model that are visible within the second display area of the tool and determining a closest 3D object in the subset of the 3D objects in the 3D model as the determined 3D object in the plurality of 3D objects in the 3D model to hide.

In some embodiments, the 3D object may be a first 3D object. The method may further receive input that moves the tool from a first position in the display area to a second position in the display area and, in response to moving the tool from the first position to the second position, determine a second 3D object in the plurality of 3D objects in the 3D model to hide. The input may be a first input. The method may further receive a second input requesting to view a 3D object behind a 3D object displayed in the display area of the tool and, in response to the second input, hide the determined second 3D object in the 3D model.

In some embodiments, a system includes a set of processing units and a non-transitory machine-readable medium that stores instructions. The instructions cause at least one processing unit to provide a display area for viewing a 3D model that includes a plurality of three-dimensional (3D) objects. The instructions further cause the at least one processing unit to provide a tool for viewing 3D objects in the 3D model. The instructions also cause the at least one processing unit to determine a 3D object in the plurality of 3D objects in the 3D model to hide. The instructions further cause the at least one processing unit to hide the determined 3D object in the 3D model.

In some embodiments, the 3D object may be a first 3D object. The instructions may further cause the at least one processing unit to receive input requesting to view a 3D object in the 3D model that is behind a 3D object displayed in the display area of the tool, where the determined 3D object in the 3D model is hidden in response to receiving the input and determine a second 3D object in the plurality of 3D objects in the 3D model to hide. The instructions may further cause the at least one processing unit to receive input requesting to view a 3D object behind a 3D object displayed in the display area of the tool and, in response to the request, hide the determined second 3D object in the 3D model. The input may be a first input. The instructions may further cause the at least one processing unit to receive a second input requesting to view a 3D object in the 3D model that is in front of a 3D object displayed in the display area of the tool and, in response to receiving the second input, unhide the determined 3D object.

In some embodiments, the display area may be a first display area. The tool may include a second display area for focusing on 3D objects in the 3D model. Determining the 3D object in the plurality of 3D objects in the 3D model to hide may include determining a subset of the 3D objects in the 3D model that are visible within the second display area of the tool and determining a closest 3D object in the subset of the 3D objects in the 3D model as the determined 3D object in the plurality of 3D objects in the 3D model to hide.

In some embodiments, the 3D object may be a first 3D object. The instructions may further cause the at least one processing unit to receive a first input that moves the tool from a first position in the display area to a second position in the display are; in response to moving the tool from the first position to the second position, determine a second 3D object in the plurality of 3D objects in the 3D model to hide; receive a second input requesting to view a 3D object behind a 3D object displayed in the display area of the tool; and, in response to the second input, hide the determined second 3D object in the 3D model.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a tool for viewing 3D objects in a 3D model. In some embodiments, a system includes a client device and a computing system that includes an application for viewing 3D models. The client device may access the application operating on the computing system and view 3D models via the application. The application may provide a 3D viewer and a tool for viewing 3D objects in 3D models. The tool can include display area for focusing on different sections of the 3D model. A user of the client device may move the display area of the tool to focus on a particular section of the 3D model. At the particular section, the user can request to view a 3D object behind the closest currently displayed (e.g., not hidden) 3D object. In response to the request, the application hides the closest currently displayed 3D object to reveal the 3D object behind it. The user can continue to request to view 3D objects behind the closest currently displayed 3D object to "drill down" into the 3D objects in the 3D model. The user may also request to view a hidden 3D object in front of the closest currently displayed 3D object. In response to such a request, the application unhides the 3D object in front of the closest currently displayed 3D object. The use may proceed to request to view hidden 3D objects in front of the closest currently displayed 3D object to "drill up" from the 3D objects in the 3D model.

Figure 1:
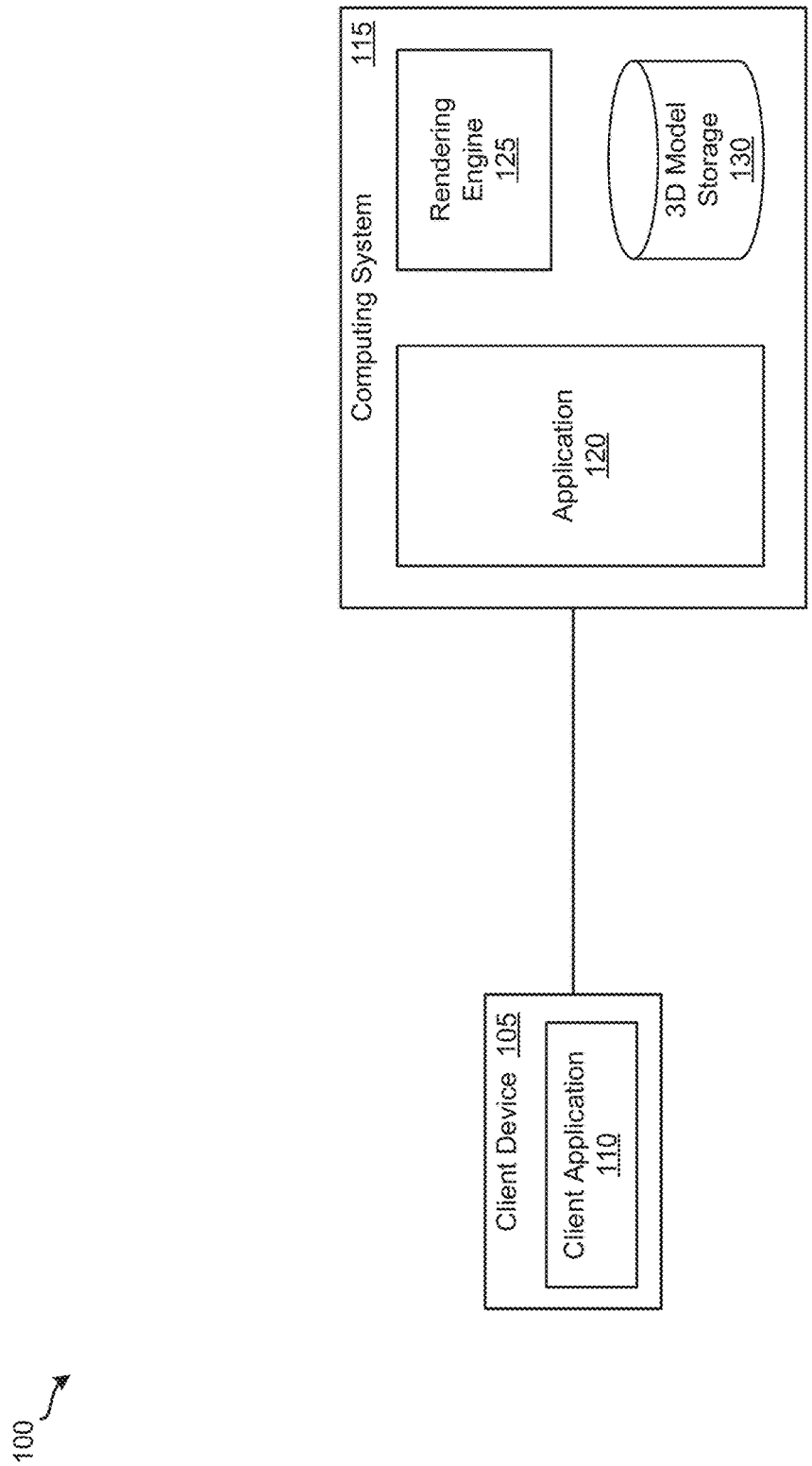
FIG. 1 illustrates a system for viewing 3D objects in a 3D model according to some embodiments.

FIG. 1 illustrates a system 100 for viewing 3D objects in a 3D model according to some embodiments. As shown, system 100 includes client device 105 and computing system 115. Client device 105 is configured to communicate and interact with computing system 115. For instance, client device 105 includes client application 110 (e.g., a web browser application, a thin client application, etc.). A user of client device 105 can use client application 110 to access and interact with application 120 in computing system 115. For example, a user of client application 110 may send application 120 a request to view a 3D model. In response, client application 110 can receive from application 120 the requested 3D model and then display it on a display of the client device 105. The user of client application 110 may send application 120 a request to enable a tool for viewing 3D objects in the 3D model. The tool can include a display area for focusing on an area of the 3D model. Once enabled, the user of client application 110 may provide input requesting to view a 3D object behind the closest 3D object currently displayed in the display area of the tool. The user can also provide input requesting to view a hidden 3D object in front of the closest 3D object currently displayed in the display area of the tool. The user may also move the display area of the tool to different sections of the 3D model to view 3D objects behind, or hidden 3D objects in front of, the closest 3D object currently displayed in the display area of the tool. In addition, the user may select and/or interact with 3D objects displayed within the display area of the tool.

As illustrated in FIG. 1, computing system 115 includes application 120, rendering engine 125, and 3D model storage 130. 3D model storage 130 is configured to stored 3D models. In some embodiments, a 3D model includes a set of 3D objects. Each 3D object in the set of 3D objects is defined in a 3D space. Examples of 3D objects include points, lines, planes, surfaces, polygons, boxes, cubes, toroids, cylinders, pyramids, triangle meshes, polygon meshes, etc.

Application 120 is a software application operating on computing system 115 that is configured to provide tools for viewing 3D objects in 3D models. For example, application 120 may receive from client device 105 a request to view a 3D model. In response, application 120 accesses 3D model storage 130, retrieves the requested 3D model, and sends the 3D model to rendering engine 125 and a request to render the 3D model. Once application 120 receives a rendered 3D model from rendering engine 125, application 120 provides it to client device 105. In some embodiments, application 120 provides the 3D model in a display area of a graphical user interface (GUI).

In some instances, application 120 receives a request from client device 105 to enable a tool for viewing 3D objects in the 3D model. In response to the request, application 120 provides the tool to client device 105. As mentioned above, the tool includes its own display area that is configured to focus on different sections of the 3D model. As part of the process for enabling the tool, application 120 detects the current position (e.g., x, y, and z coordinates) of a virtual camera used to view the 3D model and the current position (e.g., x, y, and z coordinates) of the display area of the tool. Based on the current position of the virtual camera used to view the 3D model and the position of the display area of the tool, application 120 determines a 3D object in the 3D model to hide. As explained below, application 120 may use this determined 3D object as the 3D object to hide when application 120 receives from client device 105 a request to view a 3D object behind the closest 3D object currently displayed in the display area of the tool.

When application 120 receives from client device 105 a request to view a 3D object behind the closest 3D object currently displayed in the display area of the tool, application 120 hides the determined 3D object in the 3D model to hide. Next, application 120 adds the hidden 3D object to a list of hidden 3D objects sorted according to the order in which the 3D objects are hidden. Application 120 then detects the current position of the virtual camera used to view the 3D model and the position of the display area of the tool. Based on the current position of the virtual camera used to view the 3D model and the position of the display area of the tool, application 120 determines a next 3D object in the 3D model to hide.

Application 120 may receive from client device 105 a request to view a hidden 3D object in front of the closest 3D object currently displayed in the display area of the tool. In response, application 120 determines whether the list of hidden 3D objects is empty. If the list is empty, application 120 does nothing. If the list is not empty, application 120 determines a 3D object in the 3D model to unhide based on the list. For example, application 120 determines the most recent hidden 3D object in the list of hidden 3D objects as the 3D to unhide. Next, application 120 unhides the determined 3D object in the 3D model and removes the unhidden 3D object from the list hidden 3D objects.

In some cases, application 120 can receive from client device 105 a movement of the display area of the tool to a different position in order to focus on a different section of the 3D model. In response to such a request, application 120 unhides all the 3D objects in the list of hidden 3D objects and removes all the 3D objects from the list. Then, application 120 detects the current position of the virtual camera used to view the 3D model and the position of the display area of the tool. Based on the current position of the virtual camera used to view the 3D model and the position of the display area of the tool, application 120 determines a 3D object in the 3D model to hide. As mentioned above, application 120 can use this determined 3D object as the 3D object to hide when application 120 receives from client device 105 a request to view a 3D object behind the closest 3D object currently displayed in the display area of the tool.

Rendering engine 125 is configured to render 3D models. For instance, rendering engine 125 may receive from application 120 a 3D model and a request to render the 3D model. In response, rendering engine 125 renders the 3D model and sends it to application 120. In some cases, rendering engine 125 can receive from application from application 120 a 3D model and a request to render certain 3D objects in the 3D model. Once rendering engine 125 renders those certain 3D objects, rendering engine 125 sends them to application 120.

An example operation will now be described by reference to FIGS. 2-4. The example operation will illustrate the use of the tool for viewing 3D objects in a 3D model to hide 3D objects and reveal 3D objects behind the hidden 3D objects. The operation starts by a user of client application 110 sending application 120 a request to view a 3D model. When application 120 receives the request from client application 110, application 120 accesses 3D model storage 130 and retrieves the requested 3D model. Then, application 120 sends the 3D model to rendering engine 125 along with a request to render the 3D model. In response to receiving the request, rendering engine 125 renders the 3D model and then sends it to application 120. Upon receiving the rendered 3D model, application 120 provides it to client device 105, which displays it on a display of client device 105.

Figure 2:
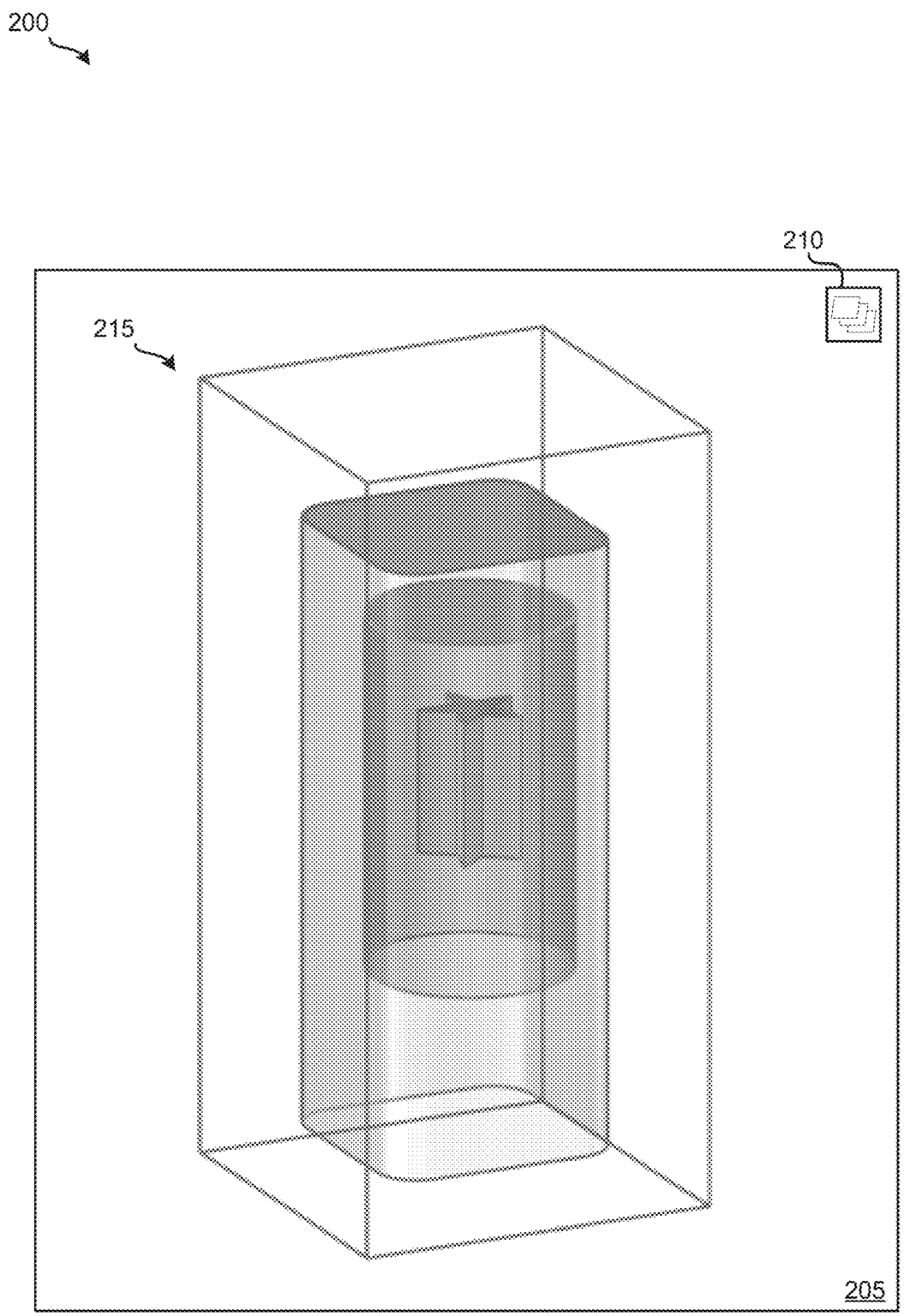
FIG. 2 illustrates a 3D model viewer according to some embodiments.

FIG. 2 illustrates a 3D model viewer according to some embodiments. Specifically, FIG. 2 illustrates a GUI 200 of a 3D model viewer that includes display area 205 and selectable user interface (UI) item 210. Application 120 provides GUI 200 to client application 110 and client application 110 displays it on a display of client device 105. Display area 205 is configured to display 3D models. Selectable UI item 210 is configured to enable or disable, when selected, a tool for viewing 3D objects in a 3D model displayed in display area 205. As shown, in this example, display area 205 is displaying a 3D model 215 that includes four 3D objects: a rectangular cube, a rounded rectangular cube, a cylinder, and a star-shaped cylinder. For this example, the four 3D objects in 3D model 215 are solid. However, for purposes of simplicity and explanation, the 3D objects are shown as transparent.

Figure 3A:
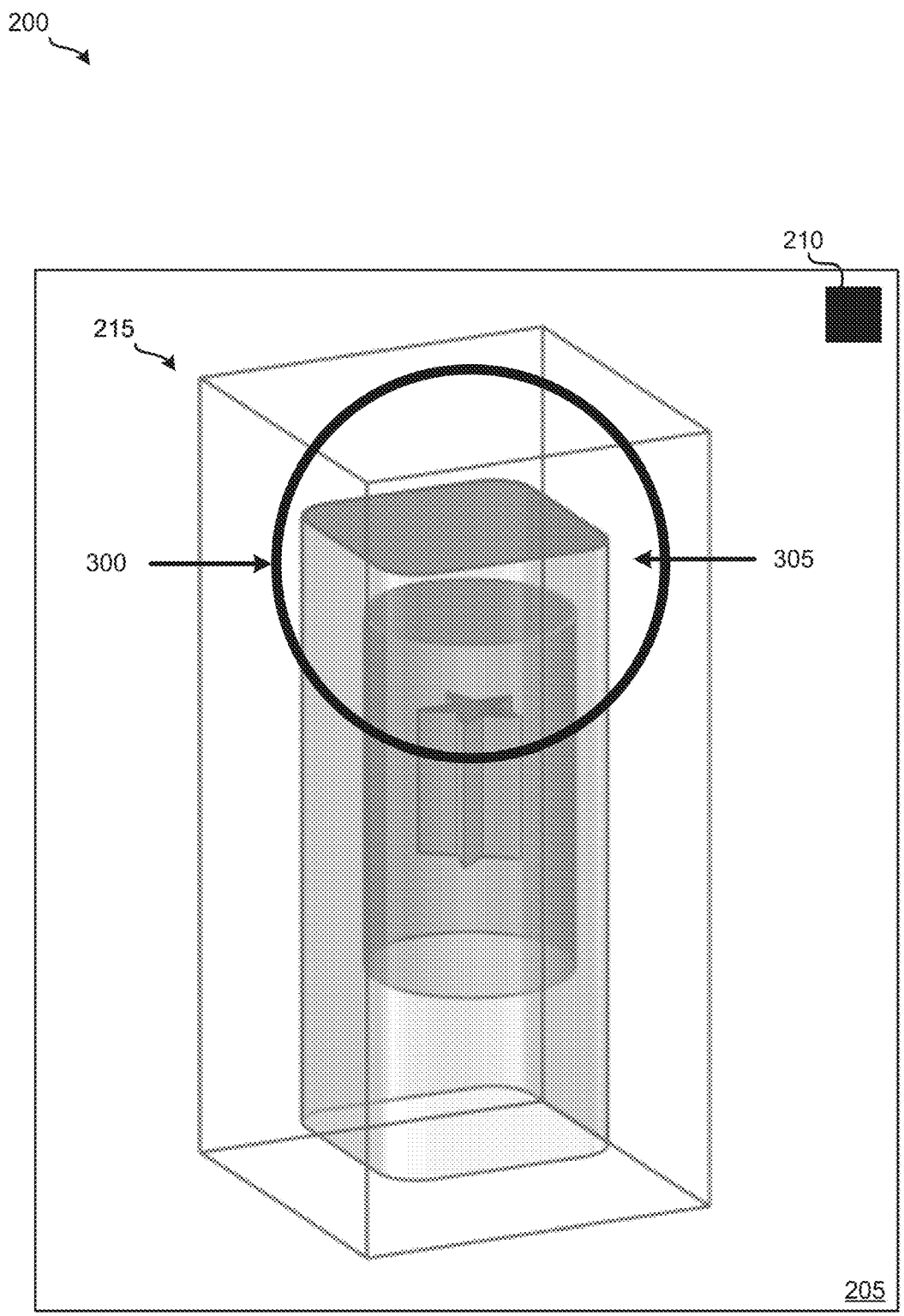
FIGS. 3A and 3B illustrate the 3D model viewer illustrated in FIG. 2 and a tool for viewing 3D objects in a 3D model according to some embodiments.
Figure 3B:
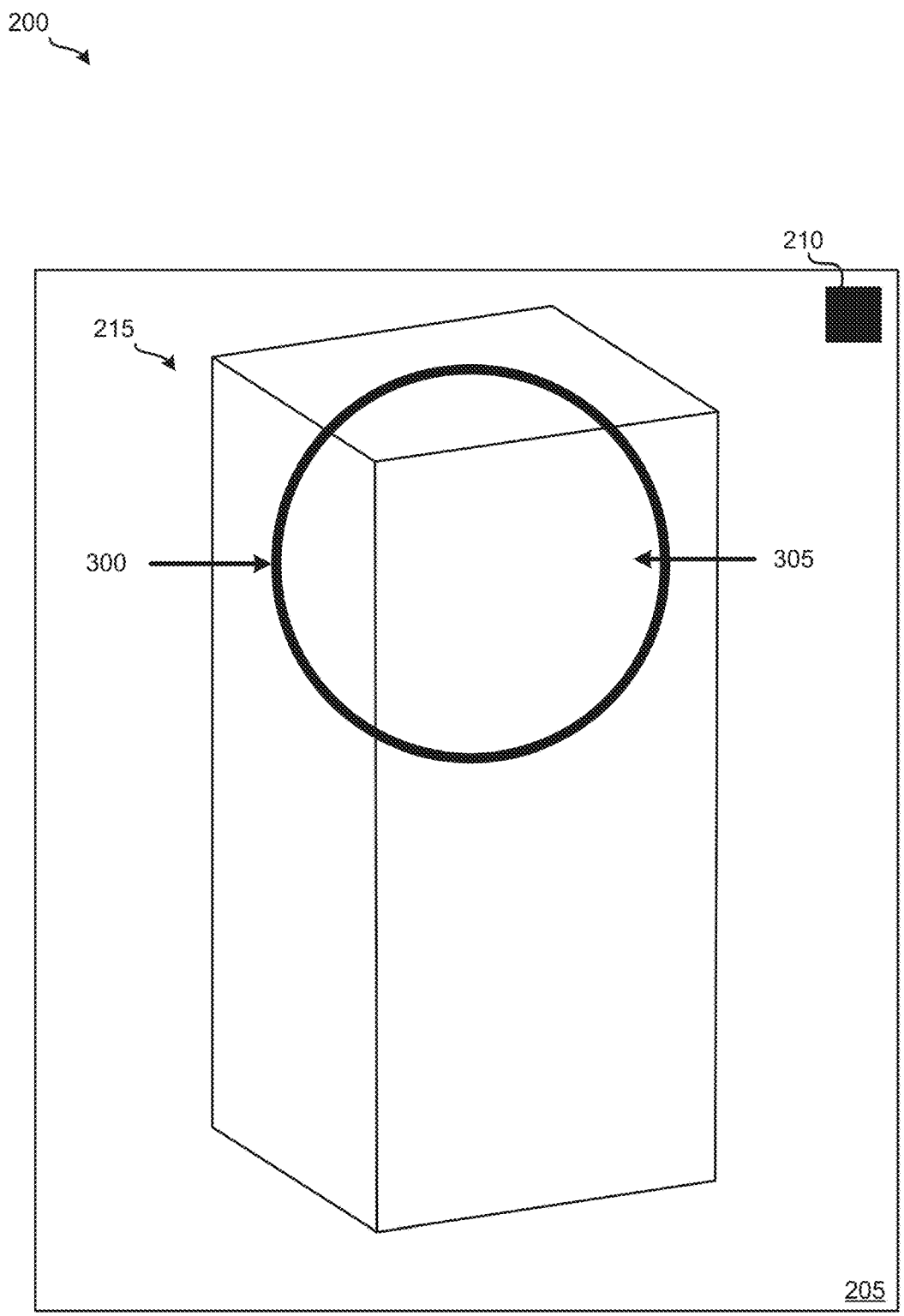

Next, the user of client application 110 sends application 120 a request to enable a tool, which includes a display area for focusing on an area of a 3D model, for viewing 3D objects in the 3D model. After receiving the request, application 120 provides the tool to client application 110. FIG. 3A illustrates the 3D model viewer illustrated in FIG. 2 and a tool 300 for viewing 3D objects in a 3D model according to some embodiments. As shown, tool 300 has been enabled, as indicated by a gray highlighting of UI item 210. Tool 300 includes a display area 305 for focusing on an area of the 3D model 215. At any time, the user of client application 205 can select and/or interact with 3D objects displayed within display area 305. In this example, display area 305 of tool 300 is focusing on the rounded rectangular cube, the cylinder, and the star-shaped cylinder in the middle of the 3D model. As mentioned above, the four 3D objects in 3D model 215 are solid, but they are shown as transparent for purposes of simplicity and explanation. FIG. 3B illustrates how 3D model 215 would actually appear in display area 205 and display area 305. As shown, only the rectangular cube in 3D model 215 is visible in display area 205 and display area 305; the rounded rectangular cube, the cylinder, and the star-shaped cylinder are not be visible in display area 205 nor display area 305.

As part of the process for enabling the tool, application 120 also detects the current position (e.g., x, y, and z coordinates) of a virtual camera used to view 3D model 215 and the current position (e.g., x, y, and z coordinates) of display area 305. For the purpose of explanation, assume an axis orthogonal to display area 205 is projected out of display area 205. For this example, the virtual camera used to view 3D model 215 is positioned along that axis. Based on this position of the virtual camera the position of display area 305, application 120 determines a 3D object in 3D model 215 to hide.

In some embodiments, application 120 determines a 3D object in 3D model 215 to hide by first determining a subset of the 3D objects in 3D model 215 that are visible within display area 305 of tool 300. To determine the subset of 3D objects in 3D model 215, application 120 sends rendering engine 125 the position of the virtual camera and the position of display area 305 and a request to determine the 3D objects that are visible in display area 305 from the perspective of the position of the virtual camera. Upon receiving the request, rendering engine 125 assigns a unique color to each 3D object in 3D model 215. Next, rendering engine 125 renders each 3D object in 3D model 215 with its assigned unique color. In some embodiments, the 3D objects in 3D model 215 rendered with their respective unique colors are never send to client device 105. Hence, they are never displayed on display area 215. Based on the render of the 3D objects in 3D model 215 in their assigned unique colors, rendering engine 125 then determines a set of unique colors that are included within display area 305 of tool 300. For each unique color in the set of unique colors, rendering engine 125 includes the 3D object having the unique color in the subset of the 3D objects in 3D model 215. Finally, rendering engine 125 sends the subset of the 3D objects in 3D model 215 to application 120. Once application 120 receives the subset of the 3D objects in 3D model 215, application 120 determines the point on a surface of a 3D object within display area 305 of tool 300 closest to the position of the virtual camera used to view 3D model 215. The 3D object in the subset of the 3D objects in 3D model 215 that has the same color as the color of the closest point is the 3D object that application 120 determines as the 3D object in 3D model 215 to hide. In this example, application 120 determines that the rectangular cube is the 3D object in 3D model 215 to hide since it is assigned the same color as the color of the point within display area 305 of tool 300 closest to the position of the virtual camera.

Figure 4A:
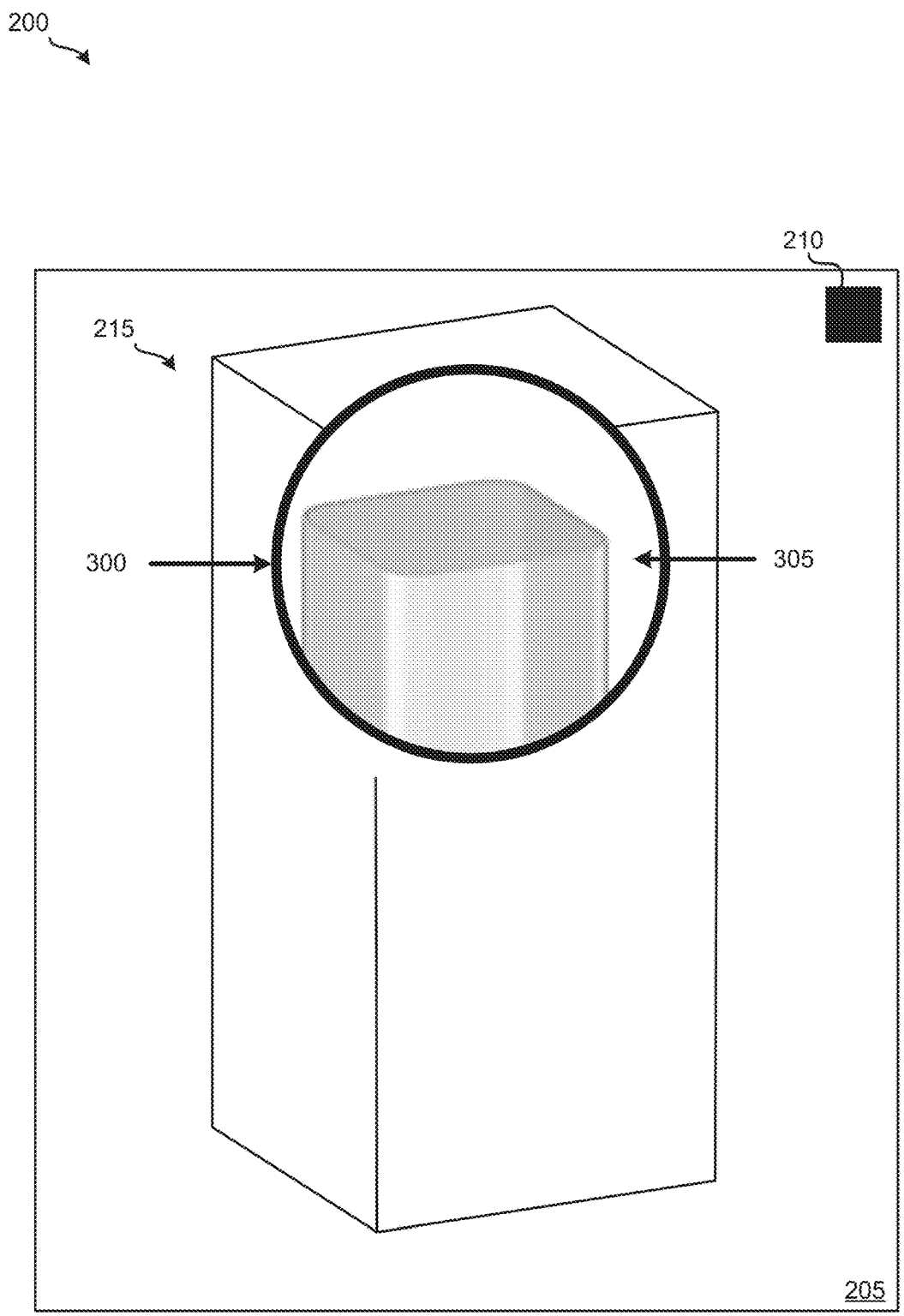
FIGS. 4A and 4B illustrate examples of hiding 3D objects in a 3D model using the tool illustrated in FIG. 3 according to some embodiments.

The user of client application 110 now provides input through GUI 200 (e.g., a selectable UI item included in tool 300; a menu item from a drop down menu, a popup menu, etc.; a scroll input from a pointing device (e.g., a mouse, touchpad, touchscreen, etc.); etc.) requesting to view a 3D object behind the closest 3D object currently displayed in display area 305 of tool 300. Upon receiving the request, application 120 hides the determined 3D object in 3D model 215 to hide. As described above, the rectangular cube is the determined 3D object in 3D model 215 to hide. Application 120 then adds the hidden 3D object to a list of hidden 3D objects sorted according to the order in which the 3D objects are hidden. Since this is the first 3D object in 3D model 215 that application 120 has hidden, the list of hidden 3D objects contains only the rectangular cube. FIG. 4A illustrates an example of hiding a 3D object in 3D model 215 using tool 300 according to some embodiments. As shown, display area 205 of GUI 200 is showing 3D model 215 after the portion of the rectangular cube in display area 305 is hidden to reveal the rounded rectangular cube inside the rectangular cube.

After hiding the rectangular cube, application 120 detects the current position of the virtual camera used to view 3D model 215 and the position of display area 305 of tool 300. Based on the current position of the virtual camera and the position of display area 305, application 120 determines a next 3D object in the 3D model to hide. Application 120 determines the next 3D object to hide in the same manner used to determine the first 3D object in 3D model 215 to hide. For this example, application 120 determines the rounded rectangular cube as the next 3D object in 3D model 215 based on the same position of the virtual camera used to view 3D model 215 and the same position of display area 305.

Figure 4B:
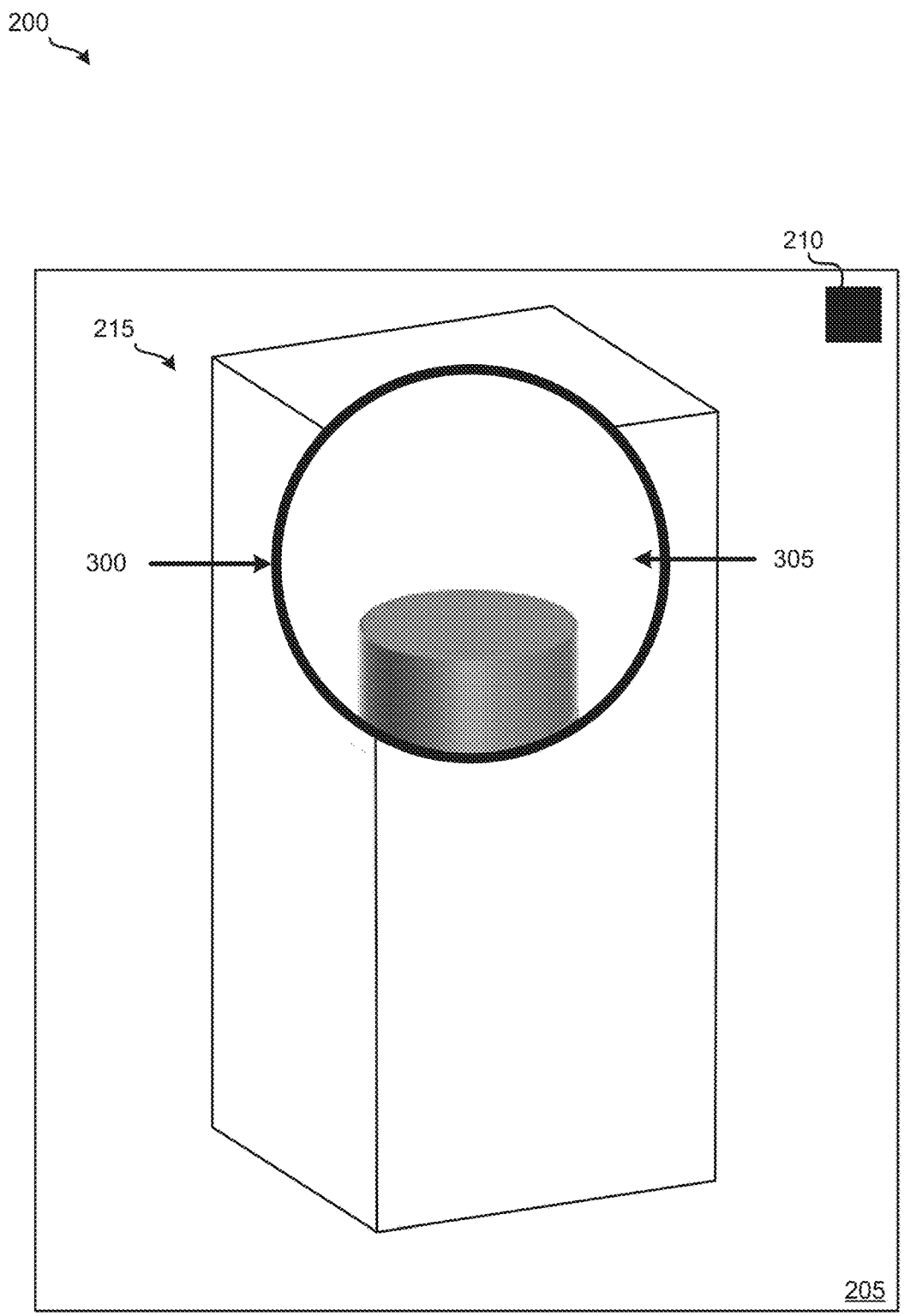

Next, the user of client application 110 provides input through GUI 200 requesting to view a 3D object behind the closest 3D object currently displayed in display area 305 of tool 300. In response, application 120 hides the determined 3D object in 3D model 215 to hide, which, in this example, is the rounded rectangular cube. Next, application 120 adds the hidden 3D object to the list of hidden 3D objects sorted according to the order in which the 3D objects are hidden. As the rounded rectangular cube is the second 3D object in 3D model 215 that application 120 has hidden, the rounded rectangular cube is added after the rectangular cube in the list. FIG. 4B illustrates another example of hiding a 3D object in 3D model 215 using tool 300 according to some embodiments. As illustrated, display area 205 of GUI 200 is showing 3D model 215 after the portion of the rounded rectangular cube in display area 305 is hidden. Display area 305 now shows within display area 305 the portion of the cylinder in 3D model 215 that is inside the rounded rectangular cube.

At this point, the user of client application 110 provides input through GUI 200 (e.g., a selectable UI item included in tool 300; a menu item from a drop down menu, a popup menu, etc.; a scroll input from a pointing device (e.g., a mouse, touchpad, touchscreen, etc.); etc.) requesting to view a hidden 3D object in front of the closest 3D object currently displayed in display area 305 of tool 300. Upon receiving this request, application 120 determines whether the list of hidden 3D objects is empty. If the list is empty, application 120 does nothing. If the list is not empty, application 120 determines the most recent hidden 3D object in the list of hidden 3D objects as the 3D to unhide. For this example, the list of hidden 3D objects is not empty. Therefore, application 120 determines that the rounded rectangular cube is the 3D object in 3D model 215 to unhide because it is the most recent hidden 3D object in the list of hidden 3D objects. Application 120 then unhides the rounded rectangular cube and removes it from the list hidden 3D objects. Once the rounded rectangular cube is unhidden, 3D model 215 illustrated in FIG. 4A is what would be shown is display area 205

Figure 5:
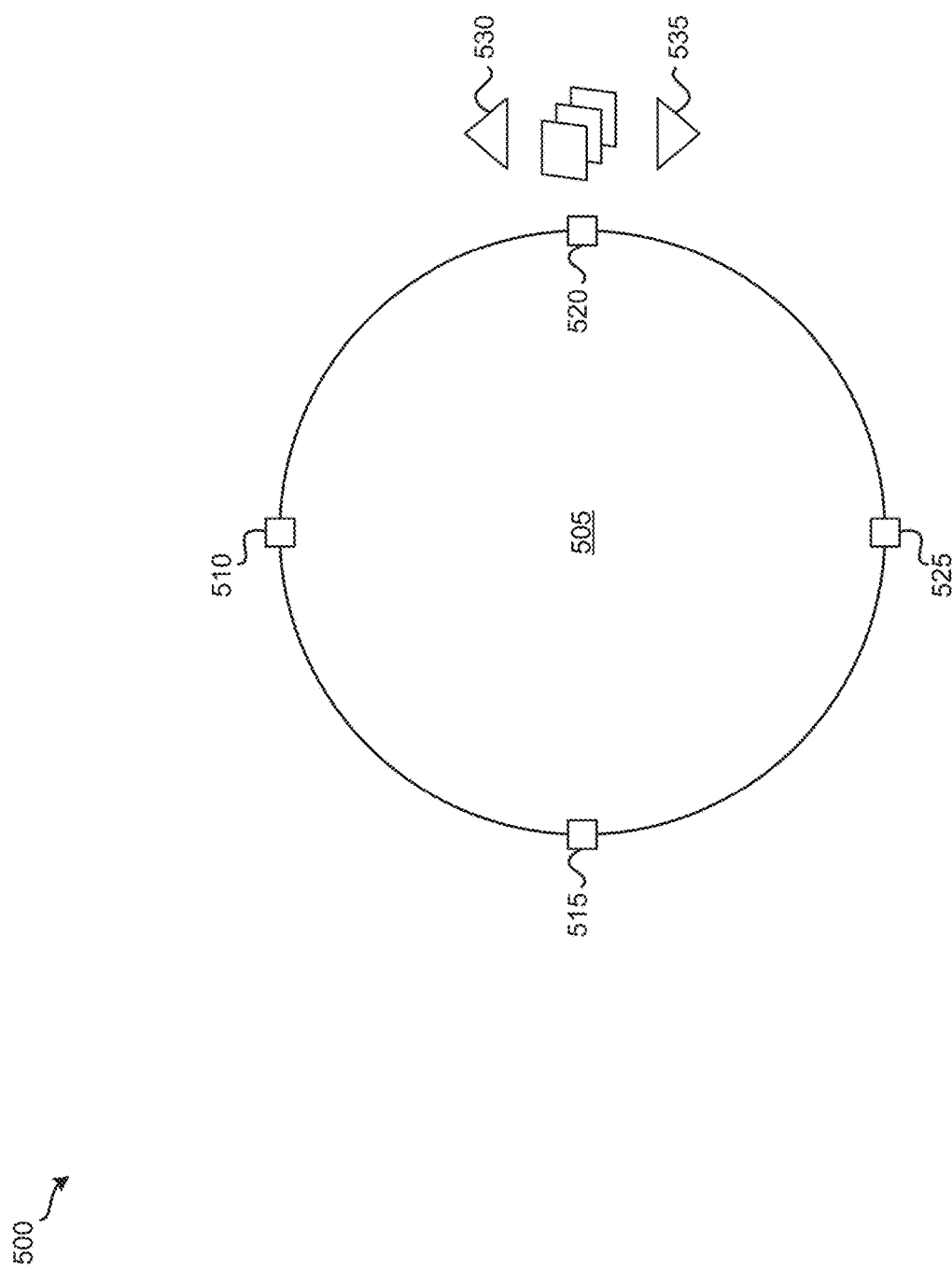
FIG. 5 illustrates an example tool for viewing 3D objects in a 3D model according to some embodiments.

FIG. 5 illustrates an example tool 500 for viewing 3D objects in a 3D model according to some embodiments. In some embodiments, tool 500 can be used to implement tool 300 described above by reference to FIGS. 2-4. As shown, tool 500 includes display area 505, UI controls 510-525, and selectable UI items 530 and 535. Display area 505 is configured to focus on areas of a 3D model (e.g., 3D model 215). Additionally, display area 505 is configured to allow a user (e.g., a user of client application 110) to select and/or interact with 3D objects displayed within display area 505.

Each of the UI controls 510-525 may be configured to adjust the size of display area 505. For example, a user can perform a drag and drop operation on any of the UI controls 510-525 using a pointing device (e.g., a mouse, touchpad, touchscreen, etc.) in order to adjust the size of display area 505. In some embodiments, the aspect ratio of display area 505 is maintained when the size of display area 505 is adjusted. For instance, of display area 505 has an aspect ratio of 1:1, using one of the UI controls 510-525 to enlarge or shrink display area 505 will still result in a circle shape. In other embodiments, the aspect ratio of display area 505 is not maintained when the size of display area 505 is adjusted. In some such other embodiments, UI controls 510-525 can be used make display area 505 taller, shorter, wider, and thinner. In some embodiments, a user can perform a drag and drop operation on the circumference of display area 505 other than where UI controls 510-525 located to move tool 500. This way, the user can move tool 500 to view other sections of a 3D model.

Selectable UI item 530 is configured to, when selected, hide the closest 3D object currently displayed in display area 505. Selectable UI item 535 is configured to, when selected, unhide a hidden 3D object in front of the closest 3D object currently displayed in display area 505. Instead of selecting UI items 530 and 535 to hide 3D objects and unhide 3D objects, other means of performing such operations can be used in some embodiments. For instance, a user may use a pointing device to hover a pointer over UI item 530 and perform a scroll operation (e.g., scroll up) to hide 3D objects. Similarly, a user may use a pointing device to hover a pointer over UI item 535 and perform a different scroll operation (e.g., scroll down) to unhide 3D objects. Other methods of input are possible.

Figure 6:
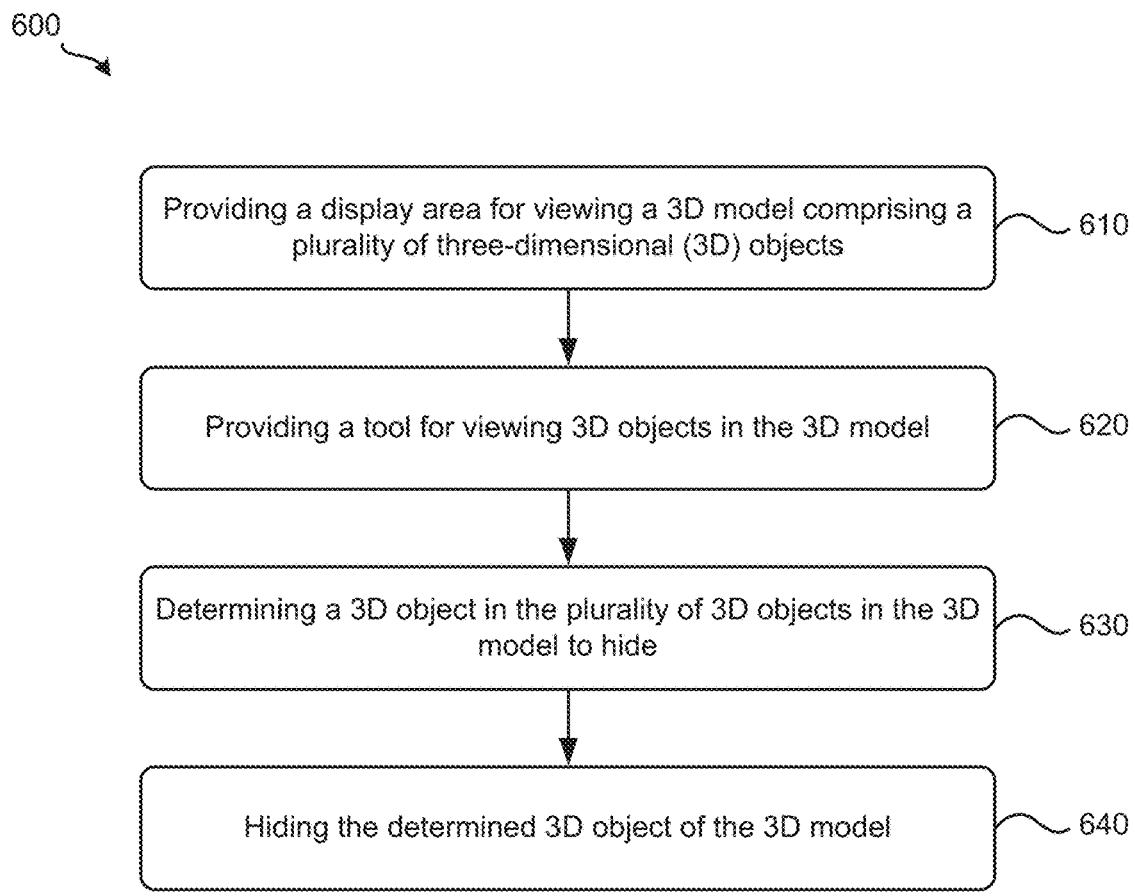
FIG. 6 illustrates a process for viewing 3D objects in a 3D model according to some embodiments.

FIG. 6 illustrates a process 600 for viewing 3D objects in a 3D model according to some embodiments. In some embodiments, application 120 performs process 600. Process 600 begins by providing, at 610, a display area for viewing a 3D model comprising a plurality of three-dimensional (3D) objects. Referring to FIGS. 1 and 2 as an example, application 120 may provide display area 205 for viewing 3D model 215 to client application 110.

Next, process 600 provides, at 620, a tool for viewing 3D objects in the 3D model. Referring to FIGS. 1 and 3 as an example, application 120 can provide tool 300 for viewing 3D objects in 3D model 215 to client application 110. Application 120 provides tool 300 in response to receiving from client application 110 a request to enable tool 300.

Process 600 then determines, at 630, a 3D object in the plurality of 3D objects in the 3D model to hide. Referring to FIGS. 1 and 3 as an example, application 120 performs operation 630 as part of the process of enabling tool 300. Application 120 can use the determined 3D object as the 3D object to hide when application 120 receives from client device 105 a request to view a 3D object behind the closest 3D object currently displayed in the display area of the tool.

Finally, process 600 hides, at 640, the determined 3D object in the 3D model. Referring to FIGS. 1 and 3 as an example, application 120 can hide the determined 3D object in the 3D model to reveal 3D objects behind and/or inside the hidden 3D object. Application 120 performs operation 640 in response to receiving from client device 110 input requesting to view a 3D object behind the closest 3D object currently displayed in display area 305 of tool 300.

Figure 7:
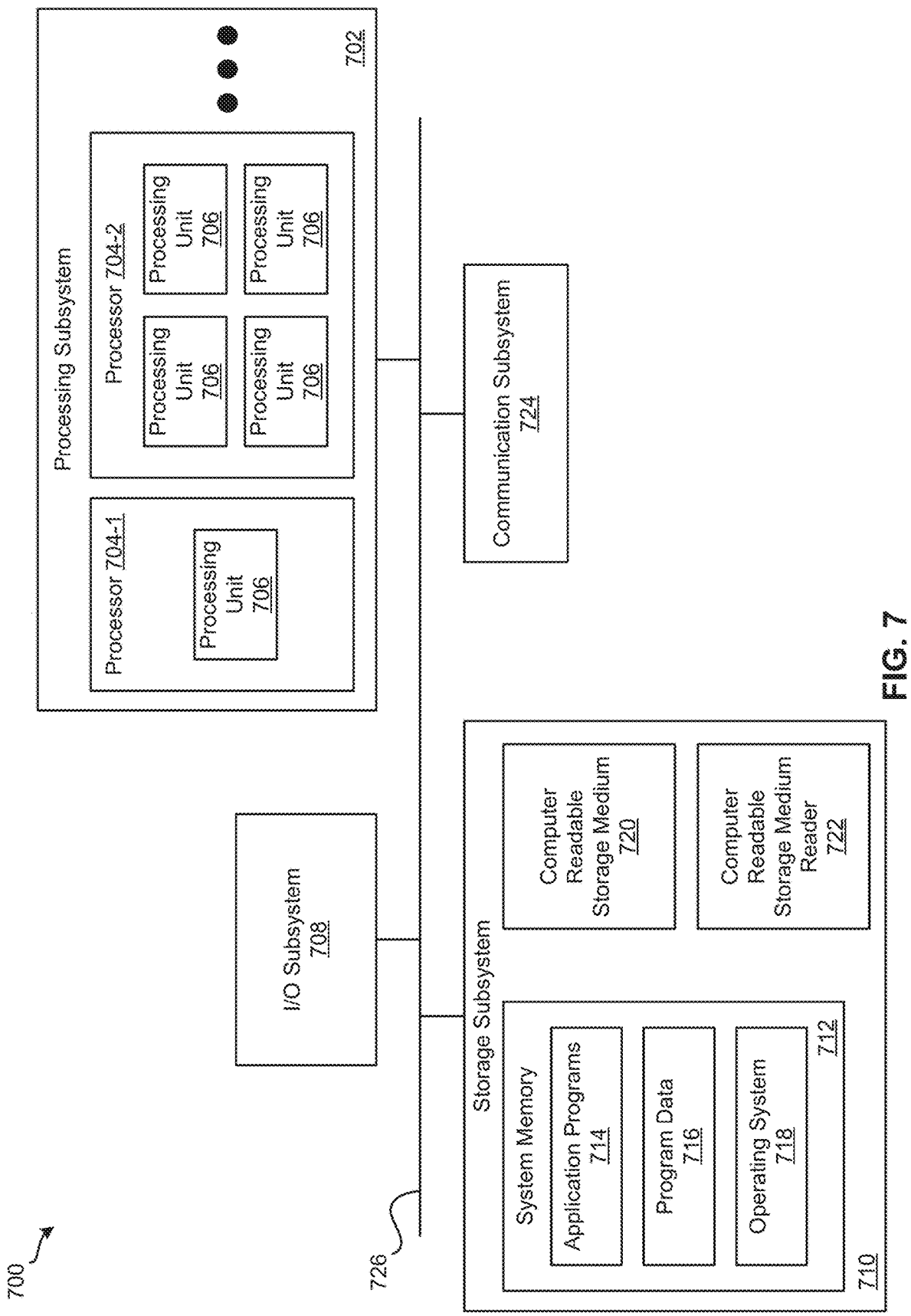
FIG. 7 illustrates an exemplary computer system, in which various embodiments may be implemented.

FIG. 7 illustrates an exemplary computer system 700 for implementing various embodiments described above. For example, computer system 700 may be used to implement client device 105 and computing system 115. Computer system 700 may be a desktop computer, a laptop, a server computer, or any other type of computer system or combination thereof. Some or all elements of client application 110, application 120, rendering engine 125, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722.

System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application client application 110 or application 120), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., client application 110, application 120, and rendering engine 125) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
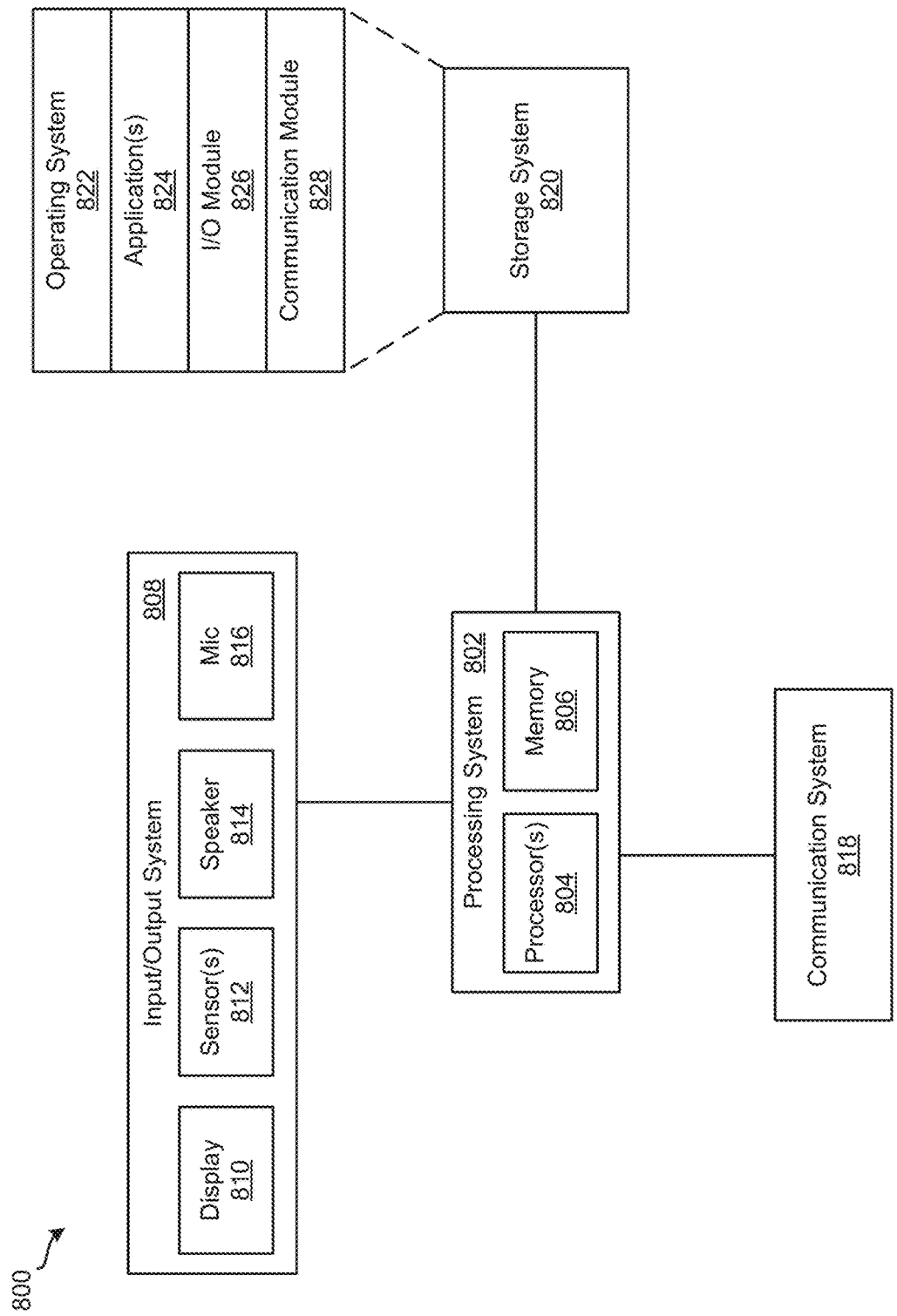
FIG. 8 illustrates an exemplary computing device, in which various embodiments may be implemented.

FIG. 8 illustrates an exemplary computing device 800 for implementing various embodiments described above. For example, computing device 800 may be used to implement client device 105. Computing device 800 may be a cellphone, a smartphone, a wearable device, an activity tracker or manager, a tablet, a personal digital assistant (PDA), a media player, or any other type of mobile computing device or combination thereof. Some or all elements of client application 110, or combinations thereof can be included or implemented in computing device 800. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrate into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., client application 110) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. For example, client application 110 may be installed on computing device 800. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
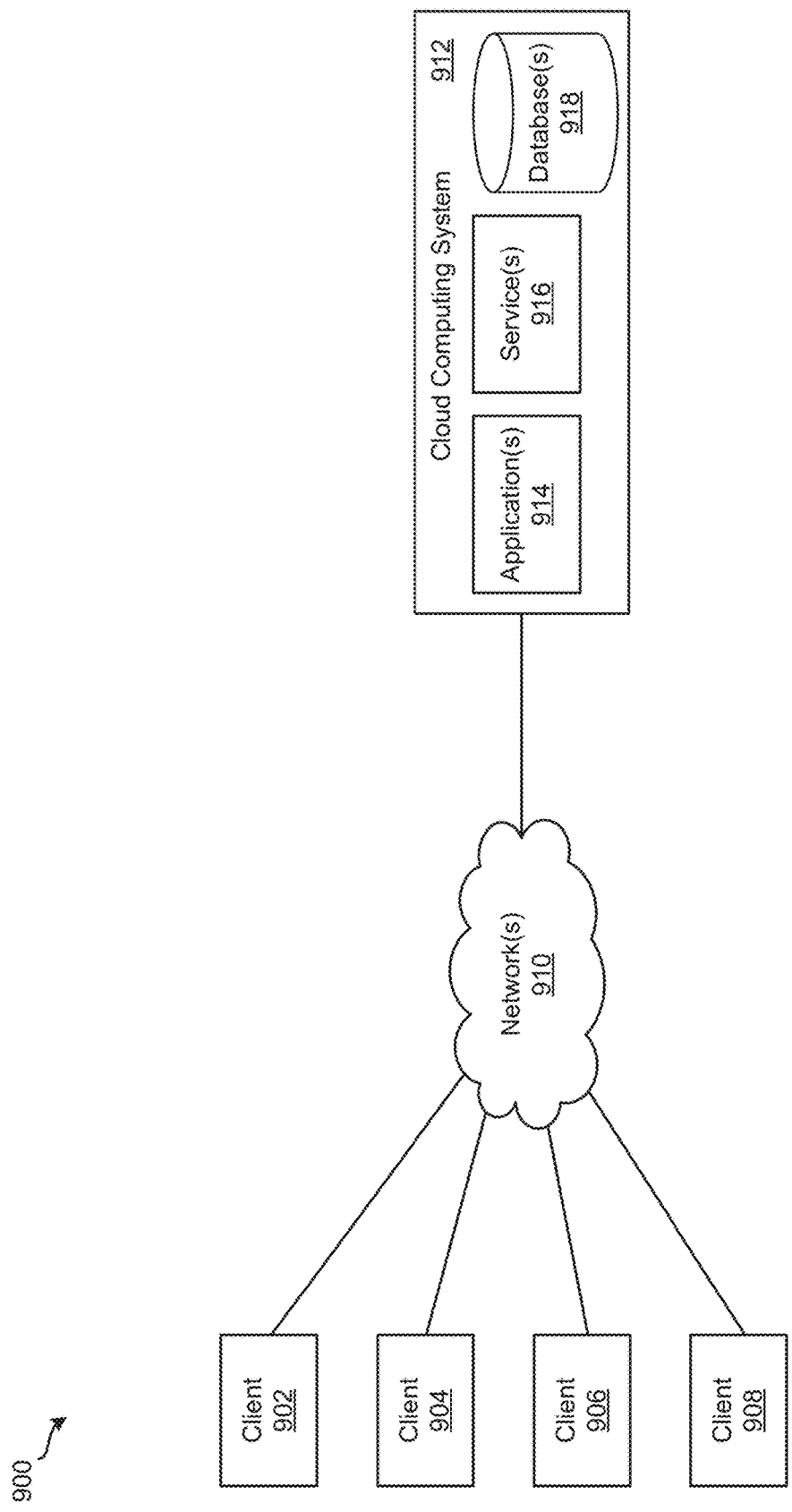
FIG. 9 illustrates an exemplary system, in which various embodiments may be implemented.

FIG. 9 illustrates an exemplary system 900 for implementing various embodiments described above. For example, cloud computing system 912 of system 900 may be used to implement computing system 115 and one of client devices 902-908 may be used to implement client device 105. As shown, system 900 includes client devices 902-908, one or more networks 910, and cloud computing system 912. Cloud computing system 912 is configured to provide resources and data to client devices 902-908 via networks 910. In some embodiments, cloud computing system 900 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 900 may provide applications 914, services 916, and databases 918 to any number of different customers in a self-service, subscription-based, elastically scalable, reliable, highly available, and secure manner.

In some embodiments, cloud computing system 900 may be adapted to automatically provision, manage, and track a customer's subscriptions to services offered by cloud computing system 900. Cloud computing system 900 may provide cloud services via different deployment models. For example, cloud services may be provided under a public cloud model in which cloud computing system 900 is owned by an organization selling cloud services and the cloud services are made available to the general public or different industry enterprises. As another example, cloud services may be provided under a private cloud model in which cloud computing system 900 is operated solely for a single organization and may provide cloud services for one or more entities within the organization. The cloud services may also be provided under a community cloud model in which cloud computing system 900 and the cloud services provided by cloud computing system 900 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 900 is referred to as a "cloud service." Typically, servers and systems that make up cloud computing system 900 are different from the on-premises servers and systems of a customer. For example, cloud computing system 900 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transport protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, 3D model storage 130 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 900. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   providing a display area for viewing a 3D model comprising a plurality of three-dimensional (3D) objects;
   providing a tool for viewing 3D objects in the 3D model;
   determining a 3D object in the plurality of 3D objects in the 3D model to hide based on a color of the 3D object; and
   hiding the determined 3D object in the 3D model and adding the determined 3D object to a list of hidden 3D objects sorted according to an order in which 3D objects are hidden, wherein the list is usable to determine an order for unhiding hidden 3D objects.

2. The non-transitory machine-readable medium of claim 1, wherein the 3D object is a first 3D object, wherein the program further comprises sets of instructions for:
   receiving input requesting to view a 3D object in the 3D model that is behind a displayed 3D object in the display area of the tool, wherein the determined 3D object in the 3D model is hidden in response to receiving the input; and
   determining a second 3D object in the plurality of 3D objects in the 3D model to hide.

3. The non-transitory machine-readable medium of claim 2, wherein the input is a first input, wherein the program further comprises sets of instructions for:
   receiving a second input requesting to view a 3D object behind a displayed 3D object in the display area of the tool; and
   in response to the second input, hiding the determined second 3D object in the 3D model.

4. The non-transitory machine-readable medium of claim 3, wherein the program further comprises sets of instructions for:
- receiving a third input requesting to view a 3D object in the 3D model that is in front of a displayed 3D object in the display area of the tool; and
- in response to receiving the third input, unhiding the determined second 3D object.

5. The non-transitory machine-readable medium of claim 1, wherein the display area is a first display area, wherein the tool comprises a second display area for focusing on 3D objects in the 3D model, wherein determining the 3D object in the plurality of 3D objects in the 3D model to hide comprises:
- determining a subset of the 3D objects in the 3D model that are visible within the second display area of the tool; and
- determining a closest 3D object in the subset of the 3D objects in the 3D model as the determined 3D object in the plurality of 3D objects in the 3D model to hide.

6. The non-transitory machine-readable medium of claim 1, wherein the 3D object is a first 3D object, wherein the program further comprises sets of instructions for:
- receiving input that moves the tool from a first position in the display area to a second position in the display area; and
- in response to moving the tool from the first position to the second position, determining a second 3D object in the plurality of 3D objects in the 3D model to hide.

7. The non-transitory machine-readable medium of claim 1, wherein the list of hidden 3D objects comprises only hidden 3D objects.

8. A method comprising:
- providing a display area for viewing a 3D model comprising a plurality of three-dimensional (3D) objects;
- providing a tool for viewing 3D objects in the 3D model;
- determining a 3D object in the plurality of 3D objects in the 3D model to hide based on a color of the 3D object; and
- hiding the determined 3D object in the 3D model and adding the determined 3D object to a list of hidden 3D objects sorted according to an order in which 3D objects are hidden, wherein the list is usable to determine an order for unhiding hidden 3D objects.

9. The method of claim 8, wherein the 3D object is a first 3D object, wherein the method further comprises:
- receiving input requesting to view a 3D object in the 3D model that is behind a displayed 3D object in the display area of the tool, wherein the determined 3D object in the 3D model is hidden in response to receiving the input; and
- determining a second 3D object in the plurality of 3D objects in the 3D model to hide.

10. The method of claim 9, wherein the input is a first input, the method further comprising:
- receiving a second input requesting to view a 3D object behind a displayed 3D object in the display area of the tool; and
- in response to the second input, hiding the determined second 3D object in the 3D model.

11. The method of claim 10, wherein the method further comprises:
- receiving a third input requesting to view a 3D object in the 3D model that is in front of a displayed 3D object in the display area of the tool; and
- in response to receiving the third input, unhiding the determined second 3D object.

12. The method of claim 8, wherein the display area is a first display area, wherein the tool comprises a second display area for focusing on 3D objects in the 3D model, wherein determining the 3D object in the plurality of 3D objects in the 3D model to hide comprises:
- determining a subset of the 3D objects in the 3D model that are visible within the second display area of the tool; and
- determining a closest 3D object in the subset of the 3D objects in the 3D model as the determined 3D object in the plurality of 3D objects in the 3D model to hide.

13. The method of claim 8, wherein the 3D object is a first 3D object, wherein the method further comprises:
- receiving input that moves the tool from a first position in the display area to a second position in the display area; and
- in response to moving the tool from the first position to the second position, determining a second 3D object in the plurality of 3D objects in the 3D model to hide.

14. The method of claim 8, wherein the list of hidden 3D objects comprises only hidden 3D objects.

15. A system comprising:
- a set of processing units; and
- a non-transitory machine-readable medium storing instructions that when executed by at least one processing unit in the set of processing units cause the at least one processing unit to:
- provide a display area for viewing a 3D model comprising a plurality of three-dimensional (3D) objects;
- provide a tool for viewing 3D objects in the 3D model;
- determine a 3D object in the plurality of 3D objects in the 3D model to hide based on a color of the 3D object; and
- hide the determined 3D object in the 3D model and add the determined 3D object to a list of hidden 3D objects sorted according to an order in which 3D objects are hidden, wherein the list is usable to determine an order for unhiding hidden 3D objects.

16. The system of claim 15, wherein the 3D object is a first 3D object, wherein the instructions further cause the at least one processing unit to:
- receive input requesting to view a 3D object in the 3D model that is behind a displayed 3D object in the display area of the tool, wherein the determined 3D object in the 3D model is hidden in response to receiving the input; and
- determine a second 3D object in the plurality of 3D objects in the 3D model to hide.

17. The system of claim 16, wherein the input is a first input, wherein the instructions further cause the at least one processing unit to:
- receive a second input requesting to view a 3D object behind a displayed 3D object in the display area of the tool; and
- in response to the second input, hide the determined second 3D object in the 3D model.

18. The system of claim 17, wherein the instructions further cause the at least one processing unit to:
- receive a third input requesting to view a 3D object in the 3D model that is in front of a displayed 3D object in the display area of the tool; and
- in response to receiving the third input, unhide the determined second 3D object.

19. The system of claim 15, wherein the display area is a first display area, wherein the tool comprises a second display area for focusing on 3D objects in the 3D model, wherein determining the 3D object in the plurality of 3D objects in the 3D model to hide comprises:

determining a subset of the 3D objects in the 3D model that are visible within the second display area of the tool; and determining a closest 3D object in the subset of the 3D objects in the 3D model as the determined 3D object in the plurality of 3D objects in the 3D model to hide.

* * * * *